June 24, 1969    HANS-GEORG BIERMANN    3,451,303
THREADED BLIND RIVET
Filed Aug. 23, 1966

INVENTOR
HANS-GEORG BIERMANN
BY
ATTORNEY.

3,451,303
THREADED BLIND RIVET
Hans-Georg Biermann, Frankfurt am Main, Germany, assignor to Gesipa Gesellschaft fur Internationale Patentverwertung m.b.H., Frankfurt am Main, Germany, a corporation of Germany
Filed Aug. 23, 1966, Ser. No. 574,336
Int. Cl. F16b 13/12, 33/04, 39/28
U.S. Cl. 85—77      4 Claims

ABSTRACT OF THE DISCLOSURE

A hollow rivet which is set by pulling a headed mandrel into the rivet body thereby deforming the rivet body. The rivet includes an enlarged head end which is provided with external screw threads so that a threaded member can be secured thereto.

---

The present invention relates to a threaded blind rivet in general and to such blind rivet consisting of a hollow rivet body with head and a rivet mandrel, which is deformed to form a so-called closing head by pulling the free shank end into the body of the hollow rivet, in particular.

The head of the hollow rivet body of the known blind rivets is designed in the form of a flange and in particular either as a so-called button-head or as a countersunk head. It serves as abutment head, on the one hand, with respect to the work pieces to be connected together and, on the other hand, with respect to the riveting tool and remains unchanged even after the riveting, aside from small insignificant consolidations of the material.

The hollow rivet head, generally known as a set head, rests firimly after the riveting against the materials which are to be connected together. After performed riveting no further connection can be produced.

It is one object of the present invention to provide a threaded blind rivet, to which one or a plurality of machine elements can be releasably secured, in particular, after the riveting by utilizing the advantages of blind riveting.

It is another object of the present invention to provide a threaded blind rivet wherein the head of the hollow rivet body is cylindrical and is equipped with a thread. This embodiment has, among others, the advantages that on the one hand, the rational blind rivets are retained, while, on the other hand, in the same operation an additional possibility of attachment is created, namely that threaded elements of different embodiments can be screwed onto the head, in particular after the riveting, which screw elements may if necessary be detachable or replaceable without affecting the rivet connection. The blind rivet, designed in accordance with the present invention, is of particular importance in cases in which frequent mountings must be effected or where blind riveting due to its rational use can advantageously take the place of screw bolts or the like.

Depending upon the purpose of use, the thread can be provided either as an outer thread or as an inner thread. It is thus possible either to thread bolts into the rivet or to apply thread nuts thereto.

It is still another object of the present invention to provide a threaded blind rivet wherein the inner thread is designed such, that it also extends into the shank of the hollow rivet body. This has the advantage, that the height of the head of the hollow rivet body can be kept substantially smaller and that special cases of attachment can be solved, respectively.

In order to avoid a turning of the riveted blind rivet, in accordance with the present invention, during the screwing on or screwing thereto additional fastening elements, the shank of the hollow rivet body can advantageously be provided with anchoring contours such as, for instance, various knurlings or else a conical configuration.

The embodiment of the blind rivet, designed in accordance with the present invention, can be suitably made either of steel, copper, aluminum or aluminum alloys.

With these and other objects in view which will become apparent in the following detailed description, the present invention will be clearly understood in connection with the accompanying drawings, in which.

Figure 1:
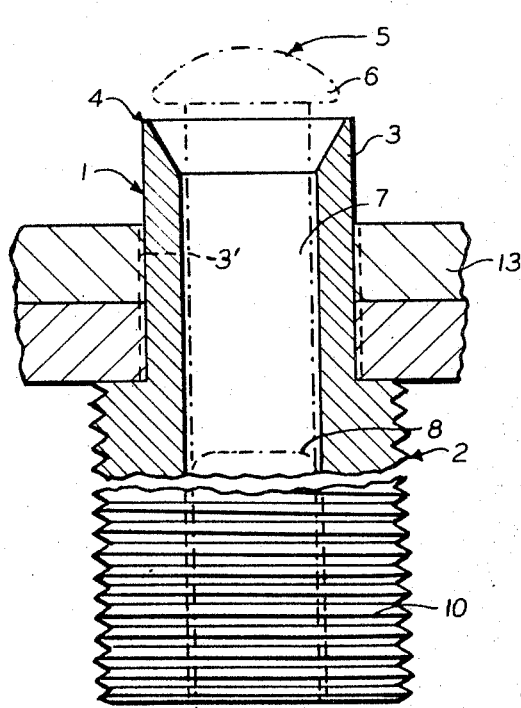
FIG. 1 is an axial section of a blind rivet, in accordance with the present invention, provided with an external thread.

Referring now to the drawing, and in particular to the embodiment of the present invention, disclosed in FIG. 1, the blind rivet comprises a hollow rivet body 1 having a head 2. The hollow rivet body 1 has a shank 3, the free end 4 of which forms a closing head. Into the hollow rivet body 1 is inserted a rivet mandrel 5 which comprises a rivet-mandrel head 6, a filling section 7, a given breaking point 8 and a shank 9. In the embodiment disclosed in FIG. 1, the head 2 is designed as a bolt 10 having an external thread.

Figure 3:
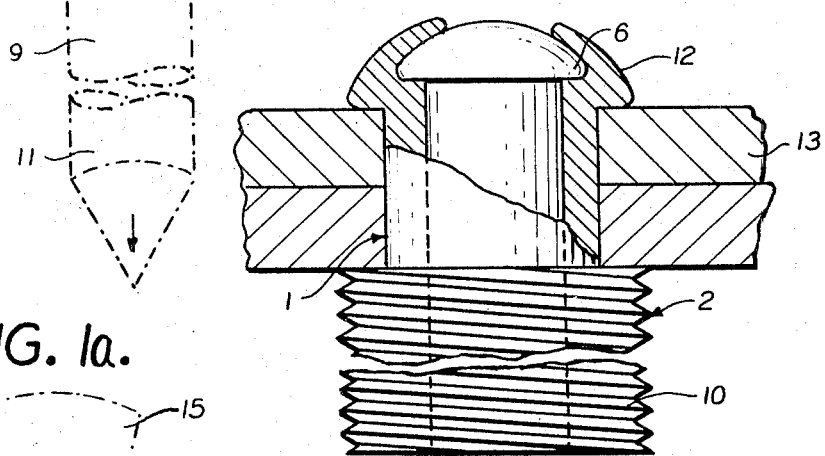
FIG. 3 is an elevation, partly in section, of a riveted blind rivet having outer thread.
Figure 1A:
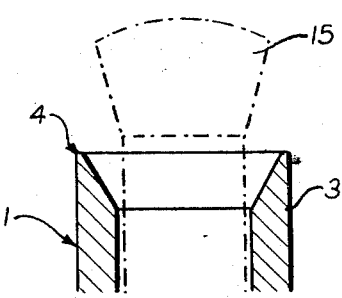
FIG. 1a is a fragmentary axial section of a blind rivet disclosing another embodiment of a rivet mandrel.

The riveting of this blind rivet is effected in the conventional manner such that the rivet mandrel 5 is drawn into the hollow rivet body 1 in the direction indicated by the arrow 11. During this operation the free end 12 of the shank 3 of the hollow rivet body 1 is forced radically outwardly (FIG. 3) by the mandrel head 6, and after a predetermined length of the path, encloses the mandrel head 6 in clamp-like manner. This flanging results in the so-called closing-head 12 (FIG. 3). Upon forming this closing-head, the rivet mandrel 5 tears off at the predetermined breaking point 8.

Variously formed nut elements (not shown) can now be screwed onto the external thread. Of course, the nut elements can also be screwed on prior to the riveting operation, as long as the mandrel shank 9 remains free for the gripping by the riveting tool. By the upsetting of the hollow rivet body 1 along its shank 3 which takes place during the riveting, the parts to be joined are pressed together in the same manner, as in ordinary blind riveting. The shank 3 of the hollow body 1 then sits in the form of a pressure seat in the inner bore of the parts to be connected. In order to prevent a rotation of the shank 3 in the borehole in the parts to be connected, it can be equipped with anchoring contours such as different types of conventional knurlings 3' or conical configurations (neither being shown) on its outer surface.

Figure 2:
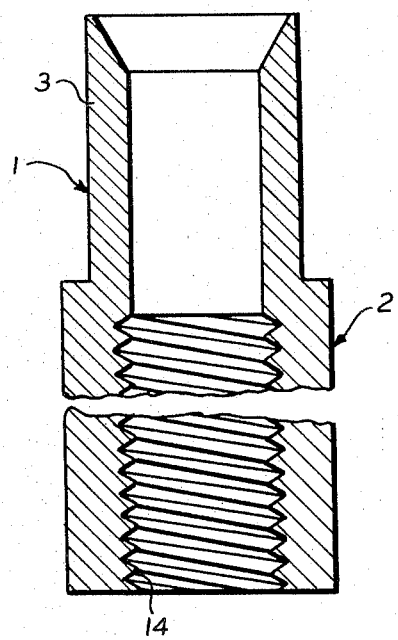
FIG. 2 is an axial section of a hollow rivet body of a blind rivet having inner thread.

Referring now again to the drawing, and in particular to FIG. 2, a modified embodiment of the present invention is disclosed. The head 2 of the hollow rivet body 1 has an inner thread 14. This inner thread 14 can also extend up into the shank 3 of the hollow rivet body 1. The deforming of such a hollow rivet body 1 can be effected, for instance, also by a rivet mandrel 5 (FIG. 1). One then also obtains a closing head, such as shown in FIG. 3.

The riveting or deforming of the hollow rivet body 1, in accordance with the present invention, can, however, also be effected with other embodiments of the rivet mandrel, than that disclosed in the drawing.

The present invention is not limited to the embodiment of the rivet mandrel or the rivet shank of the hollow rivet body, as shown in the drawing. It can be applied to all embodiments of blind rivets. In other blind riveting processes, it is merely necessary to replace the set head, present in every blind rivet, by a cylindrical head with inner or outer thread in accordance with the present invention.

While I have disclosed several embodiments of the present invention, it is to be understood that these embodiments are given by example only and not in a limiting sense.

I claim:
1. A blind rivet for riveting members, comprising
   a hollow rivet body including,
   a hollow shank portion having an outer periphery and an inner periphery and passing through the members,
   a first clamping head at one end of said shank portion and integral therewith extending axially beyond one side of said members and radially outwardly beyond said outer periphery of said hollow shank portion and having a first abutment surface abutting said one side,
   a second clamping head at the other end of said hollow shank portion and integral therewith extending axially beyond the other side of said members and having an outer surface of substantially cylindrical shape concentric with the axis of said hollow shank portion,
   said outer surface having a diameter substantially larger than that of said outer periphery of said hollow shank portion and having an annular abutment surface abutting said other side of said members,
   a rivet mandrel extending at least partly through said hollow shank portion of said hollow rivet body and having a mandrel head larger in diameter than that of said inner periphery of said hollow shank portion and held by said first clamping head deformed thereabout,
   said second clamping head of said hollow rivet body carries a thread disposed on said outer surface of said second clamping head of said hollow rivet body,
   said thread substantially extends the entire length of said second clamping head.
2. The blind rivet, as set forth in claim 1, further comprising
   means on said outer periphery of said hollow shank portion for anchoring and preventing rotation of said blind rivet.
3. The blind rivet, as set forth in claim 1, wherein
   said second clamping head has an axial length greater than that of said hollow shank portion, and
   said thread substantially extends the entire length of said second clamping head.
4. The blind rivet, as set forth in claim 1, wherein
   said hollow rivet body is made of a material selected from the group consisting of steel, copper, aluminum and aluminum alloy.

References Cited

UNITED STATES PATENTS

| | | | |
|---|---|---|---|
| 1,994,210 | 3/1935 | Chobert | 85—77 |
| 2,150,361 | 3/1939 | Chobert | 85—77 |
| 2,269,895 | 1/1942 | Foster | 151—41.72 |
| 2,612,073 | 9/1952 | Taylor | 85—77 |
| 2,675,732 | 4/1954 | Angst | 151—41.72 |
| 3,047,036 | 7/1962 | Waltermire | 151—41.73 |
| 3,149,530 | 9/1964 | Kolec | 85—77 |
| 3,204,679 | 9/1965 | Walsh | 151—41.72 |
| 3,279,303 | 10/1966 | Shackelford et al. | 85—78 |
| 3,280,872 | 10/1966 | Neuschotz | 151—41.72 |

EDWARD C. ALLEN, *Primary Examiner.*

U.S. Cl. X.R.

151—41.72